Aug. 28, 1923.

H. C. FITCH

TIRE

Filed May 5, 1922

1,466,498

Inventor
Henry C. Fitch
By Horace C. ——
Attorney

Patented Aug. 28, 1923.

1,466,498

UNITED STATES PATENT OFFICE.

HENRY C. FITCH, OF DEMOS, OHIO.

TIRE.

Application filed May 5, 1922. Serial No. 558,612.

*To all whom it may concern:*

Be it known that I, HENRY C. FITCH, a citizen of the United States, residing at Demos, in the county of Belmont, State of Ohio, have invented certain new and useful Improvements in Tires; and I do hereby declare the following to be a full, clear, and exact description of the invention, such as will enable others skilled in the art to which it appertains to make and use the same.

This invention relates to new and useful improvements in vehicle tires.

One object of the invention is to provide a tire which will be possessed of great resiliency, and which will be capable of easy and quick application to and removal from a rim.

Another object is to provide a tire of this character which will remain firmly seated in the rim, and which will be permitted freedom of resilient movement, in all directions, without danger of the tire becoming detached from the rim.

Other objects and advantages will be apparent from the following description when taken in connection with the accompanying drawing.

Figure 1:
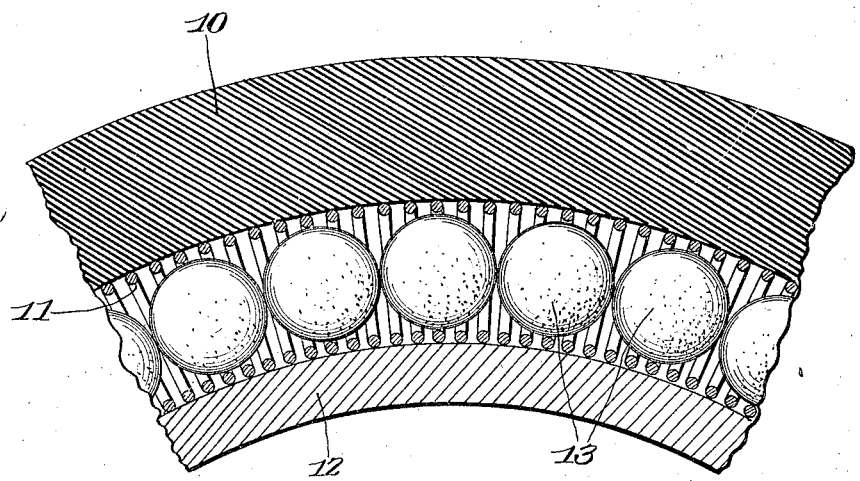
Figure 1 is a vertical longitudinal sectional view through a portion of a tire made in accordance with the invention, showing it applied to a rim, the balls being in elevation.
Figure 2:
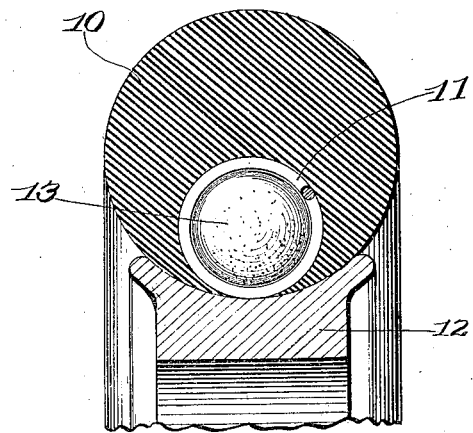
Figure 2 is a vertical transverse sectional view through the tire, showing it applied to a rim, the balls being in elevation.

Referring particularly to the accompanying drawing, 10 represents the body of the tire, which is preferably formed from solid resilient rubber, and which has a circumferential bore extending throughout the entire length thereof, the same being arranged in the inner portion of the tire, of that portion which engages the groove of the rim 12. A coil spring 11 is disposed within the bore, the base of the coil spring resting upon the rim. Within the coils of the spring there are placed the circular series of live rubber balls 13, the same being preferably solid rubber, to add to the resiliency of the tire, and to the spring.

The spring is of sufficient resiliency to yield, when the tire is to be applied to or removed from the rim, and thus permit the tire to be applied or removed with a rolling motion, over the flange of the rim. When thus applied to the rim, the stiffness of the spring will firmly hold the tire against displacement. The tire is also capable of lateral flexing movement on the rim, without danger of displacement.

What is claimed is:

The combination with a wheel rim of a tire comprising a solid resilient body having a circumferential bore extending throughout its entire length, said bore being formed in the rim engaging portion of the tire, a coil spring disposed within the bore and extending throughout the entire length thereof, the base of said coil spring resting upon the rim, the resilient body covering the entire balance of the spring, and a series of resilient spheres disposed within the coils of the spring, the tire being firmly held against displacement by the stiffness of the spring.

In testimony whereof, I affix my signature, in the presence of two witnesses.

HENRY C. FITCH.

Witnesses:
 A. BOVENIZER,
 LELAND BOVENIZER.